UNITED STATES PATENT OFFICE.

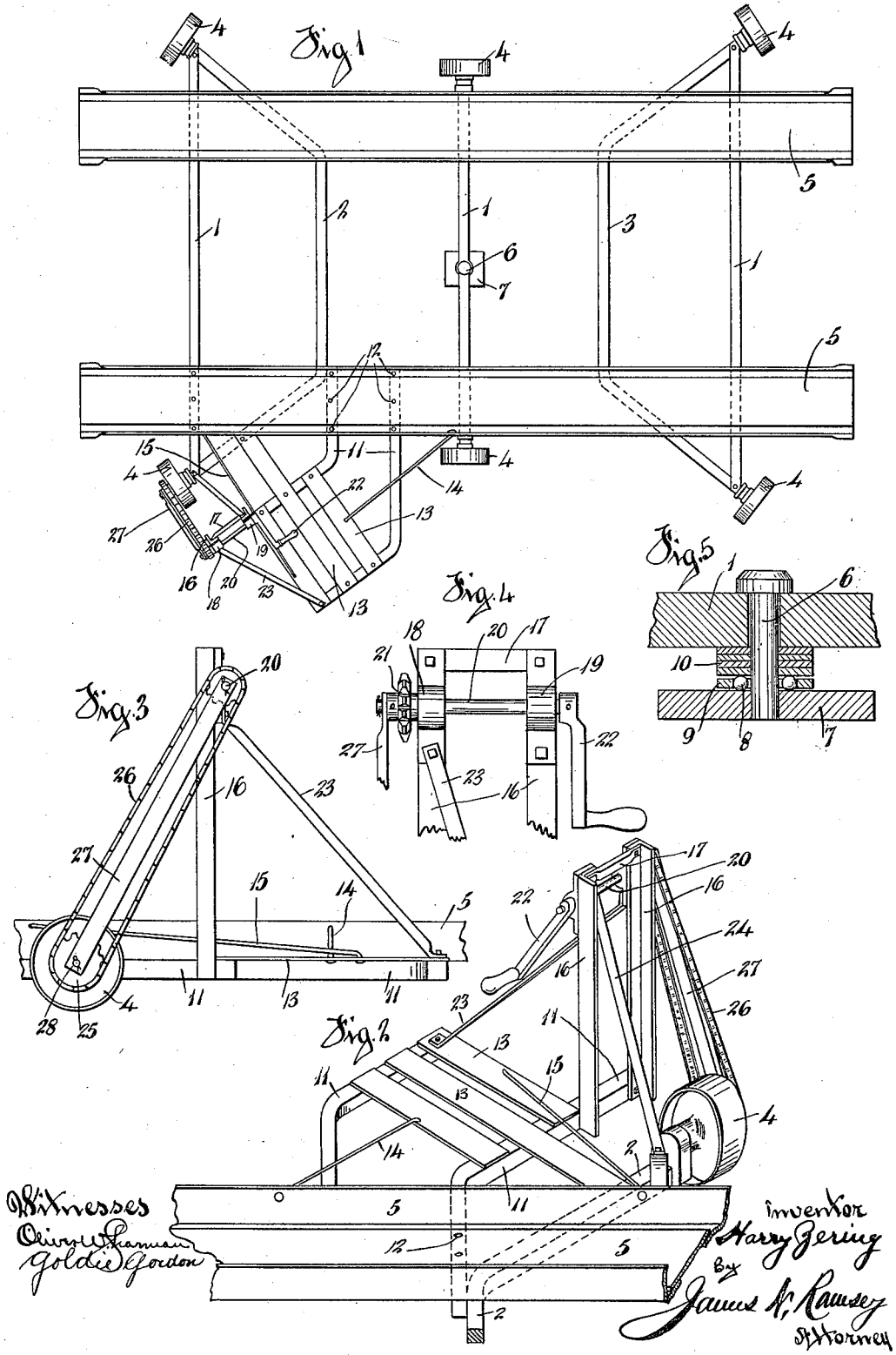

HARRY ZERING, OF CINCINNATI, OHIO.

COMBINATION TRUCK TURN-TABLE AND WINCH.

1,004,838.    Specification of Letters Patent.   Patented Oct. 3, 1911.

Application filed July 31, 1911. Serial No. 641,616.

*To all whom it may concern:*

Be it known that I, HARRY ZERING, a citizen of the United States, residing at Cincinnati, in the county of Hamilton and State of Ohio, have invented certain new and useful Improvements in Combination Truck Turn-Tables and Winches, of which the following is a specification.

My invention relates to improvements in combination truck turn table and winch, and is especially adapted to be used in turning automobiles.

The object of my invention is to provide a strong, durable and convenient combination truck turn table and winch which is easily operated when heavily loaded.

In the use of a truck turn table made especially for automobiles, and built without run-ways for the wheels of said truck to run upon, it requires a great deal of force to turn same when a heavy automobile is placed in position upon the truck. Therefore, it is a great advantage to have a truck turn table provided with a winch thereon to propel same and thereby make it easy to operate when loaded with a heavy vehicle.

My invention consists in the combination, with a truck turn table comprising a framework mounted upon wheels, each wheel placed at right angles to a line radiating from a common center of said truck turn table, of a winch mounted upon a supplementary platform and operatively connected to one of said wheels of the truck turn table and said winch adapted to be carried with the truck turn table.

My invention also consists in the peculiar combination and arrangement of parts and in the details of construction as herein set forth and claimed.

In the accompanying drawing, which serves to illustrate the construction and use of my invention: Figure 1 is a plan view of a truck turn table, built in accordance with my invention; Fig. 2 is a perspective view of a fragment of my truck turn table showing the winch and the platform for carrying the operator. Fig. 3 is an end elevation of the winch employed in my invention;
Fig. 4 is a detail view of part of said winch;
Fig. 5 is a detail view of the ball bearing employed in connection with the king bolt of the truck turn table.

In the embodiment of my invention, as illustrated, and which shows a preferred construction, 1, 2 and 3 represent the axle bars on a truck turn table upon which are mounted wheels 4 and treads or floor 5 of the truck turn table.

The truck turn table may rotate upon a king bolt 6, extending through a suitable opening in the axle bar 1. A plate 7 may be placed upon the floor and the same provided with a suitable socket to receive the end of the king bolt 6. The ball bearings 8 are preferably provided upon said plate 7 and are surrounded by retaining ring 9. Washers 10 are placed on top of said ball bearings to fill up the varying space between the floor and the axle, and the axle bar 1 is adapted to bear upon same making a simple, inexpensive and very efficient bearing for the truck turn table.

The axle bars 2 and 3 are bent so that the outer portions thereof, radiate on a line extending from the center of the truck or king bolt 6. Adjacent one end of the axle bar 2 I provide two supporting bars or beams 11 which are preferably bolted securely to the wheel tread 5 of the truck by means of bolts or rivets 12, the outer ends of supporting bars 11 being preferably bent to extend parallel to the radiating end of the axle bar 2. Placed transversely across said supporting bars or beams 11, I provide a floor preferably consisting of flat strips of metal 13 securely fastened to said supporting bars or beams 11, and I reinforce said floor by means of a bracing or reinforcing rod 14, which extends from the flat floor 13 to the sides of the wheel treads 5. Another reinforcing bar 15 is provided extending from the opposite side of said floor to the sides of said wheel treads 5. This forms a perfectly solid support or platform for the winch and for a person to stand upon while operating same.

Securely bolted to the supporting bar 11 and perpendicularly thereto are standards 16 connected at the top by a brace 17. Mounted upon these standards 16 and at the top thereof, are bearings 18 and 19 in which a crank shaft 20 is journaled. Mounted tightly upon the crank shaft 20 and adjacent the outside of the bearing 18 is a sprocket pinion 21 and at the other end of said shaft is a crank arm or handle 22 which is adapted to drive said crank shaft 20 when operated.

A brace bar 23 is fastened to the outside standard 16 adjacent the journals 18 and extends to the outside corner of the floor or platform, thereby bracing the standards of the winch. Another brace bar 24 extends from the inner standard 16 from the rear of said standard, to the axle bar 2 forming a brace in the other direction for the standard 16.

Mounted on the wheel 4 of the truck, adjacent the winch mechanism is a sprocket 25 which is in alinement with the pinion sprocket 21 of the standard 16. These two sprockets are preferably connected by means of a chain 26, whereby movement is communicated from one to the other. Another brace 27 is provided between the axle 28 of the wheel 4 and the shaft 20 thus forming a brace for the outside of the standards 16.

The operation of the device is as follows: When it is desired to turn the truck turn table, the operator stands upon a platform 13, grasps the crank handle 22 and turns same, thereby operating the pinion sprocket 21 which in turn operates the sprocket 25 fixed upon the wheel 4 and rotates the same, and the wheel 4 being operated, moves the entire truck turn table. It is readily seen that this forms a simple, compact, neat, convenient, easily operated and efficient device for turning a truck turn table. Certain modifications in the manner of driving said winch may be made if desired, as for instance bevel gears may be used instead of the sprocket and sprocket chain 26, the construction shown merely being the one preferred.

My invention could readily be modified so as to form a factory truck which could be driven in a straight line when loaded heavily in the same manner, or could be constructed to form a pit turn table with driving means therefor.

What I claim as new and desire to secure by Letters Patent is:

1. In combination with a truck turn table having axles extending on lines radiating from a common center of said truck turn table and having wheels mounted on said axles, a platform mounted on said truck turn table at the side thereof, a winch supported on said platform and operative connection between said winch and one of the wheels of said truck turn table for the purpose of propelling the same, substantially as set forth and for the purposes specified.

2. In a truck turn table, axle bars, wheels operatively secured upon each axle bar, a floor mounted upon said axle bars, a platform securely mounted upon said truck turn table adjacent one of the wheels of said truck turn table, a winch supported on said platform and adapted to operate said wheels and thereby operate the truck turn table, substantially as set forth and for the purposes specified.

3. In a truck turn table comprising a series of axle bars, wheel treads mounted thereon, said truck adapted to operate around a king bolt in the center thereof, a platform mounted on the framework of said truck having a pair of standards, bearings on said standards, a shaft journaled in said bearings, a crank arm adapted to operate said shaft, a pinion sprocket on the other end of said shaft, a sprocket fixed on one of the wheels of said truck turn table, and a sprocket chain connecting said pinion sprocket and sprocket together.

4. The combination with a truck turn table, having a plurality of wheels the axes of which radiate from the center of said truck turn table, of a platform fastened at the side of said truck turn table and suspended therefrom, standards on said platform, a crank shaft mounted at the top of said standards, a sprocket fixed on one of the wheels, a pinion sprocket on said crank shaft in alinement with said sprocket, and a sprocket chain operatively connecting same together.

5. The combination, with a truck turn table having a plurality of wheels so positioned as to cause said truck turn table to rotate in a circle, of a platform mounted adjacent one of said wheels, a sprocket on said wheel, said platform comprising a series of supporting beams fastened to the truck turn table, perpendicular standards on one of said beams, a crank shaft on said standards, a pinion sprocket on said shaft, a sprocket chain connecting the pinion sprocket and sprocket, and suitable brace bars from said standards to said platform, and brace rods from said platform to the truck turn table.

6. In a truck turn table comprising a framework of axle bars, a tread and floor on same, wheels on said axle bars, the axes of which radiate from the central point of said truck turn table, a supplementary platform mounted on one of said axle bars and a plurality of supporting bars fastened to the truck turn table, and winch mechanism mounted on said platform and connected to one of the wheels of said truck turn table for the purpose of forming driving means for the truck turn table.

7. In combination with a truck turn table having axles extending on lines radiating from a common center of said truck turn table and having wheels on said axles, a platform mounted on said truck turn table at the sides thereof, a hand operated winch supported on said platform, and means for operatively connecting said winch to one of said truck turn table wheels, substantially as set forth and for the purposes specified.

HARRY ZERING.

Witnesses:
 JAMES N. RAMSEY,
 GOLDIE GORDON.

Copies of this patent may be obtained for five cents each, by addressing the "Commissioner of Patents, Washington, D. C."